Oct. 26, 1926.

L. L. LOMAR

SNUBBER

Filed Nov. 21, 1925    2 Sheets-Sheet 1

Inventor
Louis L. Lomar
By J. W. Milburn
Attorney

Oct. 26, 1926.

L. L. LOMAR

SNUBBER

Filed Nov. 21, 1925

Inventor
Louis L. Lomar
By J.W. Milburn
Attorney

Patented Oct. 26, 1926.

1,604,834

UNITED STATES PATENT OFFICE.

LOUIS L. LOMAR, OF HOUSTON, TEXAS.

SNUBBER.

Application filed November 21, 1925. Serial No. 70,666.

My invention relates to snubbers and particularly to devices of that character in which the snubbing action is effected by the cushioning action of an enclosed fluid upon a piston.

In devices of this type it is usual to provide for escape of a portion of the fluid subjected to compressive action of the piston from one side of the piston to the other. This is ordinarily effected by means of valved or otherwise restricted passages through or around the piston.

Considerable difficulty has been experienced in determining the proper location and size of the fluid passages and in devising regulating means which may readily be adjusted to meet all operating conditions.

The principal object of my invention is to provide a snubber of this general type which includes means controlled by the movement of the piston for regulating the speed of movement of the piston to cushion its stroke.

Another object of the invention is the provision of a snubber of practical construction in which a rotatable member actuated by relative movement of the parts to which the device is connected acts upon and imparts linear motion to a piston against the resistance of a body of fluid, the construction of the piston and its relation to the other parts of the device being such that the fluid will flow from the path of the piston through apertures which will be shut off, seriatim, as the piston advances.

Still further objects are the provision of means for properly controlling and regulating the action of the snubber during the shock and rebound, and of readily accessible means for adjusting the device to meet changing operating conditions.

Figure 1 of the drawings is a horizontal sectional view of the device,

Figure 1:
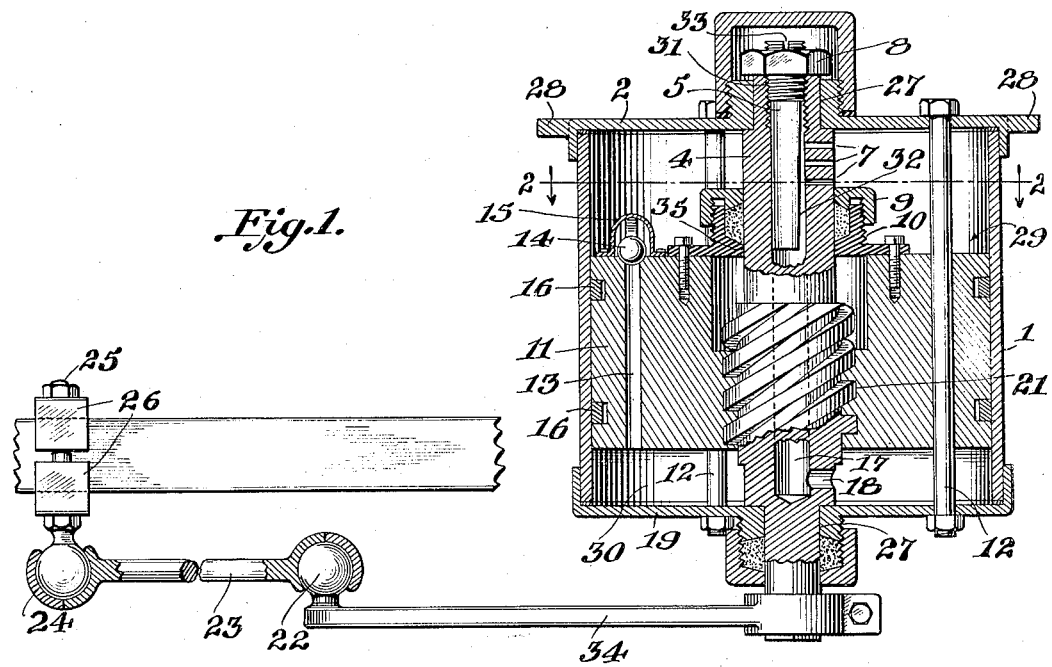
Figure 2:
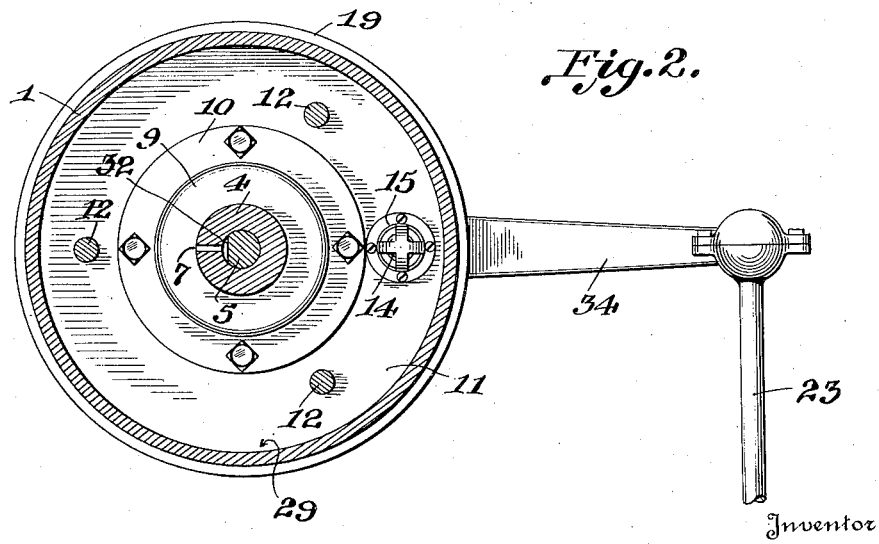
Figure 2 is a section taken on the line 2—2 of Figure 1.

In the drawings, wherein the numerals refer to like parts throughout the several views, the numeral 1 indicates the casing or cylinder of the device, provided with caps or end plates 2 and 19 at its respective ends. The end plates 2 and 19 are apertured as at 27 to provide bearings for a rotatable shaft 4. The shaft 4 has a lever 34 keyed to one end thereof and the outer end of this lever includes a ball member 22 forming part of a ball and socket connection between the lever and a rod 23 which connects the lever 34 and shaft 4 to the vehicle axle. A bracket 26, adjustable by means of a bolt 25, is adapted to fasten the free end of the rod 23 to the axle and a second ball and socket connection 24 joins the bracket and rod. A fitting 28 is attached to the end plate 2 of the casing 1 whereby the latter may be fastened to the vehicle body.

The portion of the shaft 4 nearest the cap or end plate 19 is screw-threaded at 21 and carries a piston 11 having a threaded bore. Piston 11 is held against rotation by rods 12 and will thus be reciprocated in the cylinder upon rotation of the shaft 4. The rods 12 also hold the end plates and casing in assembled position. The upper end of the screw-threaded bore of piston 11 is rendered fluid-tight by a bushing 10 and packing nut 9 between which packing is placed. The elements 9 and 10 form a sleeve 35 about the upper and unthreaded portion of the shaft 4. Packing rings 16 are positioned in the side walls of the piston and the cylinder 1 is thus divided into two separate chambers 29 and 30, preferably filled with oil or other similar liquid.

A conduit 13 extends through the piston 11 from the chamber 30 to chamber 29. This conduit is provided with a check valve 14 in a cage 15 at its opening in the chamber 29 and oil may thus flow from chamber 30 to chamber 29 upon movement of the piston toward the end plate 19.

Means to permit the oil to flow from chamber 29 to chamber 30 upon the rebound stroke of the piston 11 (toward the end plate 2) comprises a bore or conduit 17 within the shaft 4, as shown. Bore 17 is connected to chamber 30 by an aperture 18 in shaft 4 and communicates with the chamber 29 by a plurality of apertures 7, longitudinally spaced along that end of the shaft 4. The apertures 7 are located in the unthreaded portion of shaft 4, as illustrated in Figure 1. A valve or valve rod 5 is fitted in the bore 17 of shaft 4 opposite the apertures 7 and is held in position by screw threads 31 and a locknut 8. The valve 5 is preferably flattened on one side to form a face 32 and this face is tapered from the free or inner end of the valve to its screw-threaded portion. The face 32 is positioned opposite the apertures 7 and a small space 6 is thus provided between the face 32 and the apertures 7. As shown in Figure 1, this space becomes smaller toward the outer end of the shaft 4 so that less oil may flow through the outermost aperture 7 than through the inner apertures. The position of the face 32 may be changed to vary the flow of oil through the apertures 7 by loosening the locknut 8 and applying a screw driver to the slot 33 in the head of valve 5. A cap 3 is provided over the locknut 8 to exclude dust from the device.

Figure 4:
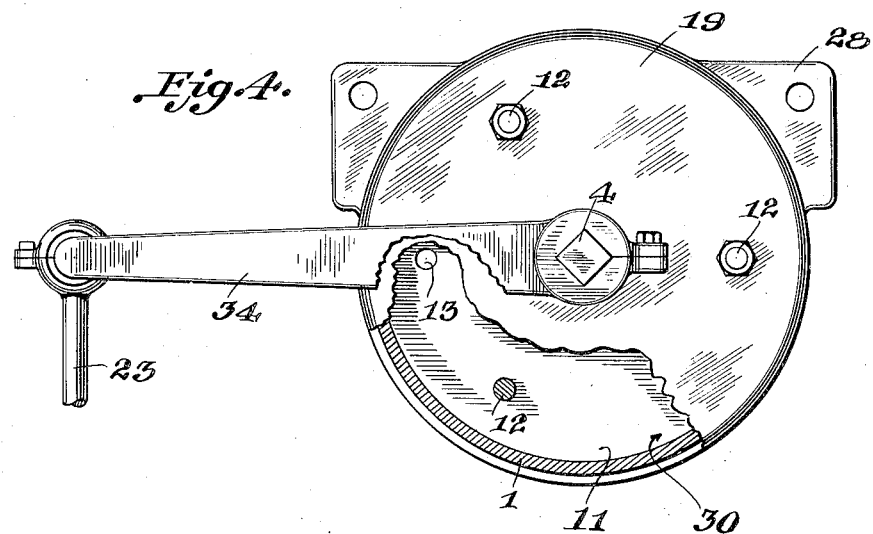
Figure 4 is an end view of the device.

In use, the casing or cylinder 1 is preferably attached to the front or rear of a vehicle by means of the bracket 28, as shown in Figure 4. The rod 23 connected to shaft 4 then extends down to the axle. A road shock which causes the axle of the vehicle to move upwardly toward the vehicle body will of course rotate the shaft 4 in a clockwise direction (Figure 1) and the piston 11 will be moved toward the end plate or cap 19. The check valve 14 will then open and the oil in chamber 30 will be forced into chamber 29 through conduit 13 as well as through the bore 17 in the shaft 4. If the road shock is so severe as to cause a sharp rebound of the axle away from the vehicle body the shaft 4 will be rotated counter-clockwise (Figure 1) and piston 11 will move toward the end plate 2. The check valve 14 will immediately close so that oil may only flow from the chamber 29 to chamber 30, through the spaced apertures 7 and into bore 17. As stated, if the rebound is severe the piston will continue its movement and the sleeve 35 will cover the apertures 14 seriatim. The flow of oil from chamber 30 will thus be gradually cut off and the movement of the piston and the rebound action of the car will of course be gradually stopped due to the fluid in the chamber 29 in the path of movement of the piston.

The gradual stopping of the movement of piston 11 is assisted by the taper valve 5 which permits less oil to flow through the outer aperture 7 than through the inner apertures.

It will be understood that ordinary shocks will only move the piston slightly and only the innermost aperture 7 would be closed on the rebound. More severe shocks would cause the sleeve 35 to close two apertures and all of the apertures would only be closed by a very severe road shock and rebound. Three apertures are ordinarily sufficient to accommodate all rebound action.

Figure 3:
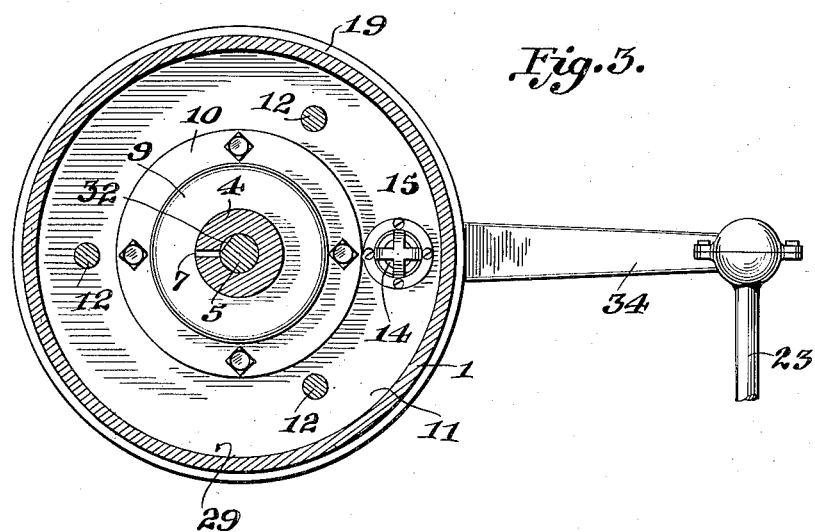
Figure 3 is a view similar to Figure 2 but showing the adjusting valve in slightly different position.

The flow of oil through apertures 7 may be very readily varied by loosening the locknut 8 and then turning the valve 5. Inward movement of the valve will of course more nearly close the space 6 between the face 32 and apertures 14, or, as shown in Figure 3, the position of the face 32 may be varied by a partial rotation of the valve 5 to more nearly close the apertures 7. In any event, the adjustment may be quickly made and without requiring that the snubber be removed from the vehicle.

I claim:—

1. In a device of the character described, a casing adapted to contain a fluid, a shaft rotatably mounted in said casing, said shaft and said casing being adapted to be connected to relatively movable parts of a vehicle, a reciprocable piston within said casing, an operative connection between said shaft and said piston for reciprocating said piston, said shaft having a valved bore communicating with the spaces on opposite sides of said piston and adapted to be controlled by movement of said piston.

2. In a device of the character described, a casing adapted to contain a fluid, a shaft rotatably mounted in said casing, said shaft and said casing being adapted to be connected to relatively movable parts of a vehicle, a reciprocable piston within said casing and an operative connection between said shaft and said piston, said shaft having a bore communicating with the spaces on opposite sides of said piston through a plurality of apertures, said apertures being adapted to be closed seriatim by movement of said piston.

3. In a device of the character described, a casing adapted to contain a fluid, a shaft rotatably mounted in said casing, said shaft and said casing being adapted to be connected to relatively movable parts of a vehicle, a reciprocable piston within said casing and an operative connection between said shaft and said piston, said shaft having a bore communicating with the spaces on opposite sides of said piston through a plurality of apertures, and a valve in said bore to regulate flow of the fluid through said apertures, said apertures being adapted to be closed seriatim by movement of said piston.

4. In a device of the character described, a casing adapted to contain a fluid, a shaft rotatably mounted in said casing, said shaft and said casing being adapted to be connected to relatively movable parts of a vehicle, said shaft being screw-threaded at one end, a reciprocable piston within said casing and mounted in threaded engagement upon said shaft whereby rotation of said shaft will reciprocate the piston, said shaft having a bore communicating with the spaces on opposite sides of said piston through apertures, the apertures in the unthreaded portion of said shaft being longitudinally spaced and adapted to be closed seriatim by movement of said piston over the unthreaded portion of said shaft 5. In a device of the character described, a casing adapted to contain a fluid, a shaft rotatably mounted in said casing, said shaft and said casing being adapted to be connected to relatively movable parts of a vehicle, said shaft being screw-threaded at one end, a reciprocable piston within said casing and mounted in threaded engagement upon said shaft whereby rotation of said shaft will reciprocate the piston, said shaft having a bore communicating with the spaces on opposite sides of said piston through apertures, the apertures in the unthreaded portion of said shaft being longitudinally spaced, a sleeve carried by said piston and adapted to move upon the unthreaded portion of said shaft to close said apertures.

6. In a device of the character described, a casing adapted to contain a fluid, end plates carried by said casing, a shaft rotatably mounted in said casing, said shaft and said casing being adapted to be connected to relatively movable parts of a vehicle, said shaft being screwthreaded at one end, a reciprocable piston within said casing and mounted in threaded engagement upon said shaft whereby rotation of said shaft will reciprocate said piston, means to guide said piston and to hold said end plates upon said casing, a check valve controlling a conduit in said piston and adapted to be opened upon movement of the piston in one direction, said shaft having a bore communicating with the spaces on opposite sides of said piston through apertures, the apertures in the unthreaded portion of the shaft being longitudinally spaced, a packing sleeve carried by said piston and adapted to move upon the unthreaded portion of said shaft to close said apertures seriatim, and a tapered valve rod in said bore adjacent said spaced apertures whereby flow of fluid through said apertures may be regulated.

LOUIS L. LOMAR.